Sept. 15, 1925.

F. HODGKINSON

BALANCING MACHINE

Filed July 7, 1920    2 Sheets-Sheet 1

1,554,006

INVENTOR.
F. Hodgkinson
BY D.C.Davis
ATTORNEY

Sept. 15, 1925.

F. HODGKINSON 1,554,006

BALANCING MACHINE

Filed July 7, 1920

INVENTOR.
F. Hodgkinson
BY D.C. Davis
ATTORNEY

Patented Sept. 15, 1925.

1,554,006

UNITED STATES PATENT OFFICE.

FRANCIS HODGKINSON, OF SWARTHMORE, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed July 7, 1920. Serial No. 394,575.

*To all whom it may concern:*

Be it known that I, FRANCIS HODGKINSON, a subject of the King of Great Britain and Ireland, and a resident of Swarthmore, in the county of Delaware and State of Pennsylvania, have invented a new and useful Improvement in Balancing Machines, of which the following is a specification.

This invention relates to balancing machines and particularly to machines adapted to be employed in ascertaining the weight distribution with relation to the axis of rotation of the body to be balanced.

Methods usually employed for obtaining static balance of rotatable bodies are not always accurate and may not disclose the fact that the gravity axis of the body does not coincide with the axis about which it is to be rotated. For example, the distribution of weight about the axis of rotation may not be symmetrical longitudinally or transversely of the axis, but it may be such that an improper distribution will not be disclosed by tests for static balance. The present method of static balancing may not disclose a weight distribution in which the heavy spots are not in the same transverse plane, whereas rotation of the body will introduce a new and disturbing force. That is, the heavy spots are now subjected to centrifugal force, which of course acts radially, and as they are not in the same transverse plane, with relation to the axis of rotation, a couple is produced and vibration results. In order to dynamically balance the body the couple must be eliminated or counterbalanced, and it is necessary to find the intensity and direction of the resultant forces, or their equivalent, which occasion the couple, in order that they may be compensated, as for example, by introducing counterbalancing forces or couples. Obviously, if the disturbing forces are completely counterbalanced, the body will will be in dynamic balance and consequently in static balance, since the gravity axis under such conditions will coincide with the axis of rotation.

An object of my invention is to produce a new and improved machine for indicating the direction and intensity of disturbing forces caused by the rotation of the body.

A further object is to produce a new and improved dynamic balancing machine in which the opposite ends of the body to be investigated are mounted in such a manner that the weight distribution longitudinally of the axis of rotation may be ascertained with sufficient accuracy to perfect the dynamic balance of the body.

A further object is to produce a new and improved dynamic balancing machine and a new and improved method of investigating dynamic balance or unbalance of rotating bodies.

A further object is to produce a new and improved dynamic balancing machine which may be employed for accurately determining the condition of dynamic balance or unbalance of a body without the necessity of first statically balancing the body.

These and other objects which will be made apparent throughout the further description of my invention are attained by means of apparatus embodying the features herein described and illustrated in the drawings accompanying and forming a part hereof.

In the drawings: Fig. 1 is a diagrammatic sectional view of a balancing machine embodying my invention.

Figure 1:
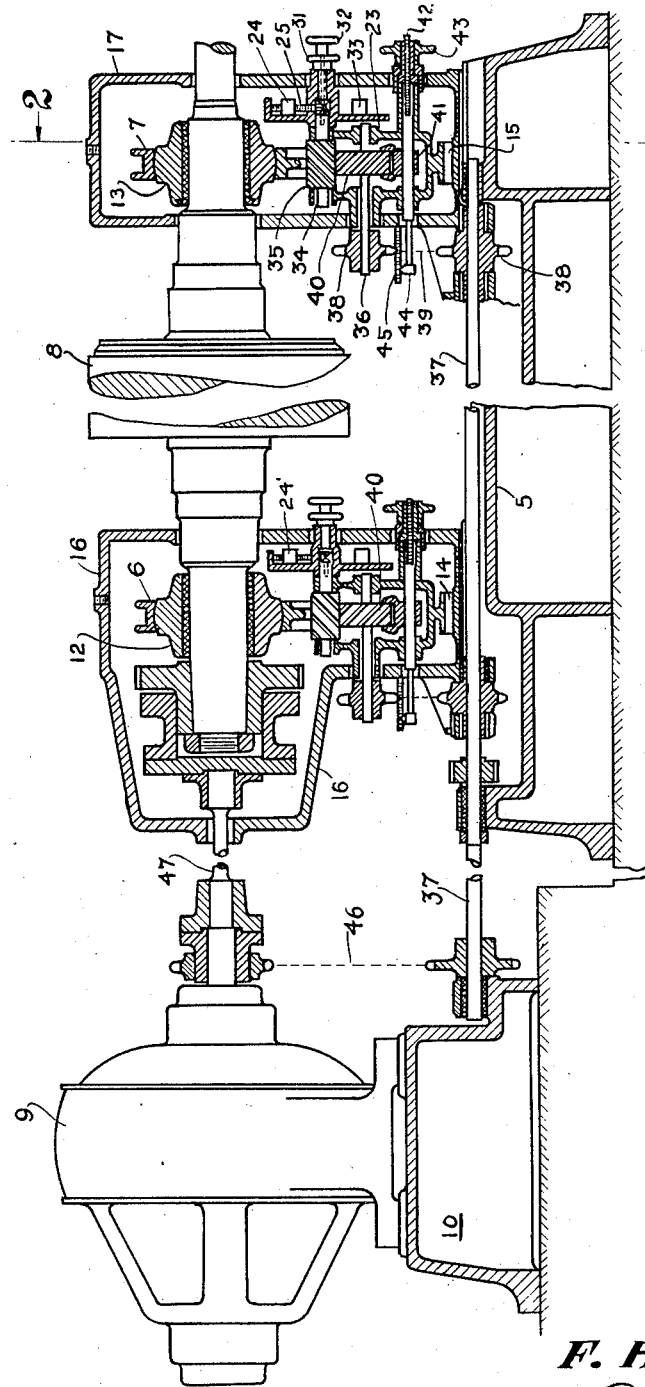
Figure 2:
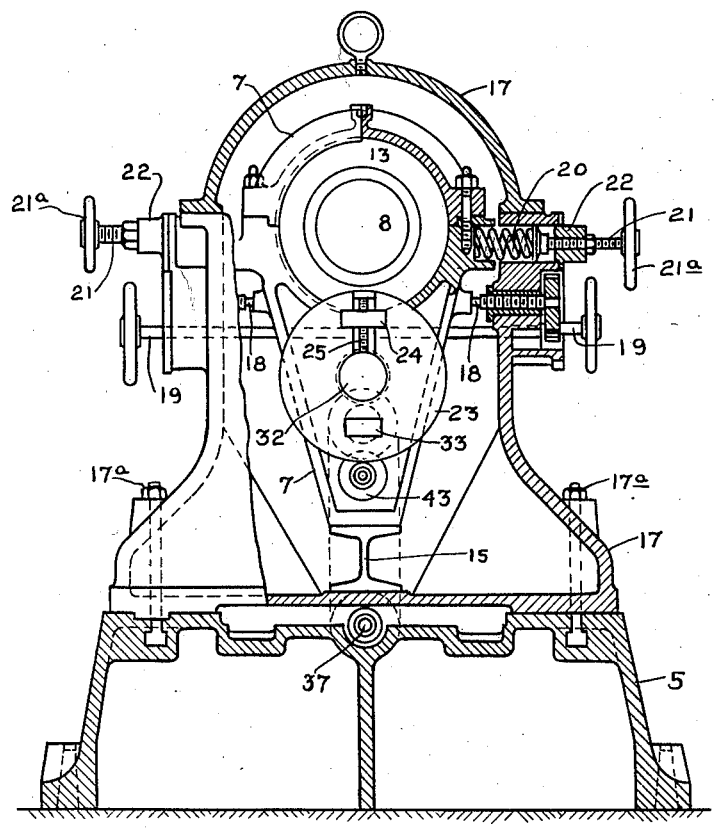
Fig. 2 is a diagrammatical sectional view along the line 2—2 of Fig. 1 but on a larger scale.

In Figs. 1 and 2, I have illustrated a balancing machine having a suitable base 5 and two pedestals 6 and 7 which, as shown, are slidably mounted on the base 5 and are adapted to support opposite ends of the body to be investigated for dynamic balance. As illustrated, a turbine rotor 8 is mounted in the balancing machine in position to be investigated. I have illustrated a motor 9 for spinning the rotor 8 and driving the working elements of the balancing machine. The motor 9 is shown as mounted on a separate base 10, at some distance from the balancing machine in order that relatively long flexible connecting shafts may be employed for spinning the rotor and driving the operating parts of the balancing machine.

As illustrated, the pedestal 6 is provided with a spherically seated bearing 12 in which one end of the shaft of the rotor 8 is journaled. The pedestal 7 is similarly provided with a spherically seated bearing 13 in which the other end of the rotor shaft is journaled. Both pedestals 6 and 7 are shown supported on I-beams 14 and 15, which extend longitudinally of the rotor and are sufficiently flexible through their web portions to permit the upper ends of the pedestals to vibrate in a lateral plane, i. e., in a plane substantially at right angles to the axis of the rotor. As shown, the pedestals 6 and 7 are enclosed within suitable housings 16 and 17, which do not interfere with the vibratory motion of the pedestals, and which enclose working parts of the machine. The I-beam portions 14 and 15 are secured to the pedestals 6 and 7 and to the housings 16 and 17, respectively, in any suitable manner. The pedestals may be moved along the base 5 so as to accommodate rotors or other bodies of different lengths. While the housings 16 and 17 are likewise movable along the base they are adapted to be rigidly secured in place on the base, by means of bolts 17a.

The vibrations or lateral movements of the upper end of the pedestal 7 may be limited by means of adjustable stops 18 mounted on the rigid housing 17. One stop is shown on each side of the pedestal. As shown, both stops 18 are adapted to be simultaneously operated by a shaft 19, which extends across the housing 17 and is geared to the stops in such a manner that a movement of one stop is accompanied by an equal and opposite movement of the other stop. I have also shown adjustable springs 20 mounted in the housing 17 and bearing against the opposite side of the pedestal 7 for the purpose of either damping or accentuating the vibration of the pedestal. As illustrated, the force of the springs may be adjusted by means of suitable screws 21 which I have shown provided with hand wheels 21a. As illustrated, the screws 21 are mounted in caps 22 which may be removed for the purpose of changing the springs. The pedestal 6 is preferably provided with a similar set of stops and springs, which are not illustrated.

I have illustrated means associated with each pedestal 6 and 7 for counteracting the unbalanced forces or couples set up by the rotation of the rotor 8 during the operation of testing it for dynamic balance. This means includes a rotatable wheel or disc 23 mounted on the pedestal 7 and adapted to be rotated about an axis parallel to the axis of rotation of the rotor 8. An adjustable weight 24 is mounted on the disc 23, the weight being carried by a screw 25 so that it is capable of being moved radially toward and away from the center of rotation of the disc.

Figure 3:
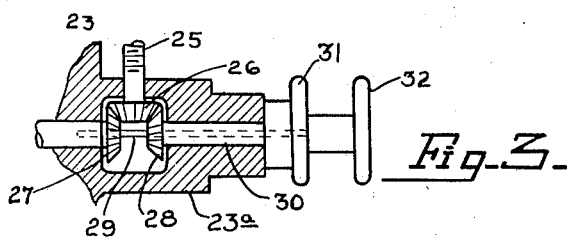
Fig. 3 is an enlarged view of a detail of the apparatus illustrated in Fig. 1.

In Fig. 3, I have shown an enlarged view of a device suitable for adjusting the position of the weight 24 irrespective of whether the disc 23 is or is not rotating. As illustrated, the screw 25 terminates within the hollow interior of the hub 23a of the disc 23 and is provided at its inner end with a bevel gear 26 which is adapted to mesh with two other bevel gears 27 and 28. The bevel gears 27 and 28 are shown axially aligned with the axis of rotation of the disc 23 and meshing with opposite sides of the gear 26. As illustrated, the gear 27 is mounted on a shaft 29 which extends through a hollow shaft 30 on which the gear 28 is mounted. Both shafts 29 and 30 are, of course, aligned with the axis of rotation of the disc 23 and are respectively provided with hand wheels 31 and 32. As shown in Fig. 1, the hand wheels 31 and 32 are located in an easily accessible position outside of the pedestal housing 17, so that the radial position of the weight 24, with relation to the disc 23, may be easily adjusted. When the disc 23 is at rest either hand wheel 31 or 32 may be employed for shifting the position of the weight 24 in either direction. However, when the disc 23 is rotating, the screw 25 may be turned in one direction by holding the hand wheel 31 against rotation, and in the other direction by holding the hand wheel 32 against rotation. Thus the weight 24 may be moved outwardly with relation to the center of the disc by holding one hand wheel, and it may be moved inwardly by holding the other hand wheel. It will be apparent that with the arrangement of the gears 25, 26 and 27 illustrated both hand wheels 31 and 32 will normally tend to rotate with the disc 23, and that the adjustment of the weight 24, above described, may be accomplished by manually retarding one or the other hand wheel.

In Figs. 1 and 2, I have illustrated a fixed weight 33 mounted on the disc 23 for the purpose of counterbalancing the adjustable weight 24 when the latter is in its intermediate position. With the disc 23 rotating an unbalanced centrifugal force may be occasioned on either side of the disc by shifting the weight 24 in or out from its intermediate position; this of course destroys the counterbalance between the weights 24 and 33.

As illustrated, the disc 23 is mounted on a shaft 34, which is supported in suitable bearings mounted on the pedestal 7 and on which I have shown a spiral or helical gear 35. Below and parallel with the shaft 34, I have shown another shaft 36 which, as illustrated, is adapted to be driven by a lay shaft 37 through the agency of sprocket wheels 38 and a chain 39. Feathered on the shaft 36, I have shown a spiral or helical gear 40 which meshes with the gear 35 and therefore drives the disc 23. As shown, the gear 35 may be moved along the shaft 36 by means of a shifter 41. The shifter 41 is adapted to engage opposite sides of the gear 40 and is shown as mounted on a shaft 42 which, as illustrated, is slidably mounted below and in parallel relation with the shafts 34 and 36. As illustrated, one end of the shaft 42 is threaded and is provided with a nut or hand wheel 43 by means of which it may be moved to different longitudinal positions for the purpose of changing the position of the shifter 41. I have shown a pointer 44 on the other end of the shaft 42 which cooperates with a scale 45 in indicating the angular position of the gear 40 with relation to the gear 34.

In the apparatus illustrated, the pedestal 6 is provided with an adjustable weight 24' which is driven and controlled by means of apparatus similar in all respects to the apparatus just described.

As shown, the motor 9 is adapted to drive the lay shaft 37 by means of a chain drive 46, and is also adapted to drive the rotor 8 by means of a flexible shaft 47. The lay shaft 37 is preferably driven at such a speed, relative to the speed of the rotor 8, that the rotor and the adjustable weights 24 and 24' operate in synchronism, that is, at the same speed. The angular relation between the rotor and the weights may be varied by means of the mechanism employed for shifting the longitudinal position of the gears 40. For example, the weight 24 may be shifted to a leading or lagging angular position relative to the rotor 8 by turning the hand wheel 43 so as to shift the gear 40 with relation to the gear 35 and thereby cause an angular advance or lag of the disc 23, and hence the weight 24. This results from the angular disposition of the teeth of the gears 40 and 35. It will, of course, be understood that with the apparatus illustrated, the rotation of the rotor and the weights 24 and 25 is not synchronous during the short time the angular position of the weight is being altered.

In operation, the rotor 8 to be investigated for dynamic balance is first mounted in the machine and connected to the motor 9 by the flexible shaft 47. The adjustable weights 24 and 24' are preferably in their intermediate or counterbalanced position. The motor 9 is then started causing the rotor and the weights to rotate in synchronism. The stops 18 are then moved away from the pedestals and if the rotor is out of balance the pedestals will start to vibrate. The vibrations may be damped or accentuated by properly adjusting the springs 20.

In order to correct an unbalanced condition of the rotor, it is necessary to determine the angular position and the intensity of the disturbing forces or couples or of the resultant of the forces or couples. This is accomplished by shifting the position of the weights 24 and 24' both in angular and in radial directions, as necessary, until the vibrations of the pedestals 6 and 7 are reduced to a minimum or are substantially eliminated. This operation induces counterbalancing forces or couples and results in a dynamic balance of the rotating parts of the balancing machine, including the rotor 8 as a part of the machine. It also definitely indicates the changes in weight distribution of the rotor 8 necessary to accomplish its dynamic balance. It is apparent that the apparatus indicates the intensity and direction of the disturbing forces or couples, since the radial position of each weight 24 and 24' with relation to its disc may be readily ascertained and the angular position of each weight with relation to the rotor 8 may also be ascertained by means of the pointer 44. The hand wheels 31 and 32 may be provided with cooperating scales to indicate the radial position of the weight 24 or 24' associated with them.

In practice the usual procedure is to as nearly as possible eliminate the vibrations of one pedestal or the vibrations occasioned by one end of the rotor. The other end of the rotor is then balanced as near as possible. The latter operation usually introduces new forces which disturb the balance of the previously balanced end. The end first balanced is rebalanced until the vibrations of the supporting pedestal are reduced to a minimum, and the operation is repeated, if necessary, until a satisfactory balance is obtained at both ends of the machine. Material is then added to or removed from different portions of the rotor, so as to accomplish the necessary distribution of weight in the rotor to place it in dynamic balance. After the rotor has been corrected, the weights 24 and 24' are again moved to their intermediate or counterbalanced positions, and the balancing operation is repeated for the purpose of ensuring correct balancing of the rotor.

While I have described and illustrated but one embodiment of my invention, it will be apparent to those skilled in the art that various changes, modifications, additions and omissions may be made in the apparatus described and illustrated without departing from the spirit and scope of the invention, as set forth by the appended claims.

What I claim is:

1. In a balancing machine, the combination of pendulum supports, each of which is movably mounted at one end and rotatably supports a body to be balanced at the other end, means for rotating the body on said supports, separate rotatable means associated with each support for imposing forces thereon to counterbalance the forces imposed thereon and occasioned by the unbalanced condition of said body, means for driving the separate rotatable means from the first means so that said separate rotatable means are operated synchronously with said body, and means associated with said separate rotatable means for varying the intensity of said counterbalancing forces and for varying their times of application to said pendulum supports.

2. In a balancing machine, the combination of two pendulum supports, tiltably mounted at their lower ends and having bearings at their upper ends for supporting a rotary body to be balanced, separate means associated with each pendulum support for imposing impulses thereon, means for rotating the body and for operating said separate means synchronously, means for varying the magnitude of the impulses, and means to cause said impulses to lead or lag with respect to rotation of the body.

3. In a balancing machine, the combination of a housing structure, an oscillatory support carried by the housing structure, spring means interposed between the housing structure and said oscillatory support, a bearing carried by the support for a body to be balanced, impulse-developing means associated with the supports for imposing impulses on the latter to counterbalance impulses due to lack of balance of the body, means for rotating the body and operating the impulse-developing means synchronously, and means for varying the magnitude and the time of application of the impulses developed by said means.

4. In a balancing machine, the combination of two balancing devices each of which includes an oscillatory support, bearings carried by the supports for supporting the body to be balanced, rotary bodies carried by the supports and capable of being unbalanced while in operation, and transmission mechanism for driving the body being balanced and the rotary bodies synchronously including means for varying the angular or phase relationship between the body being balanced and the rotary bodies.

5. In a balancing machine, a pivoted cradle in which the body to be balanced is rotatively mounted, a counter-balancing element mounted on said cradle and rotative about an axis different from that of said body, comprising a body dynamically balanced with reference to its axis of rotation, means for synchronously rotating said body and said counter-balancing element, indicator elements associated with said counter-balancing element for indicating the circumferential position of the unbalanced weight concentration of said body, and means for correspondingly varying circumferential weight distribution of the counter-balancing element while said element and said body are rotating, said pivoted cradle being adapted to oscillate in a plane normal to the rotational axes of the body and the counter-balancing element.

6. In a balancing machine, the combination of a pedestal member, a bearing for the body to be balanced carried by the pedestal member, rotatable counterbalancing means carried by the pedestal member, means for rotating the body and the counterbalancing means, and a flexible supporting device for the pedestal member.

7. In a balancing machine, the combination of a pedestal member, a bearing for supporting a body to be balanced, a counterbalancing device carried by the pedestal member below the bearing, means for rotating the body to be balanced and the counterbalancing device, and flexible supporting means for the pedestal member located below the counterbalancing device.

In testimony whereof, I have hereunto subscribed my name this twenty-fifth day of June, 1920.

FRANCIS HODGKINSON.